US008576489B2

(12) United States Patent
Reininger

(10) Patent No.: US 8,576,489 B2
(45) Date of Patent: Nov. 5, 2013

(54) MULTIHYBRID ARTIFICIAL COMPOUND EYE WITH VARIED OMMATIDIA

(75) Inventor: Francis Mark Reininger, Tujunga, CA (US)

(73) Assignee: Spectral Imaging Laboratory, Pasadena, CA (US)

(*) Notice: Subject to any disclaimer, the term of this patent is extended or adjusted under 35 U.S.C. 154(b) by 180 days.

(21) Appl. No.: 13/193,582

(22) Filed: Jul. 28, 2011

(65) Prior Publication Data

US 2012/0026592 A1 Feb. 2, 2012

Related U.S. Application Data

(60) Provisional application No. 61/370,084, filed on Aug. 2, 2010.

(51) Int. Cl.
*G02B 27/10* (2006.01)
(52) U.S. Cl.
USPC ............ 359/619; 359/621; 359/622; 359/626
(58) Field of Classification Search
USPC .................................. 359/619, 621, 622, 626
See application file for complete search history.

(56) References Cited

U.S. PATENT DOCUMENTS

| | | | |
|---|---|---|---|
| 4,357,088 A | 11/1982 | Pomerantzeff | |
| 4,437,735 A | 3/1984 | Momiyama | |
| 6,449,103 B1 | 9/2002 | Charles | |
| 6,571,043 B1 | 5/2003 | Lowry | |
| 6,898,015 B2 | 5/2005 | Yoshikawa | |
| 6,933,167 B2 | 8/2005 | Yamamoto | |
| 6,942,959 B2 | 9/2005 | Dubin | |
| 6,967,779 B2 | 11/2005 | Fadel | |
| 7,106,529 B2 | 9/2006 | Gurevich et al. | |
| 7,119,962 B2 | 10/2006 | Kerr et al. | |
| 7,184,090 B2 | 2/2007 | Watanabe | |
| 7,187,502 B2 | 3/2007 | Gurevich | |
| 7,217,573 B1 | 5/2007 | Oshida | |
| 7,286,295 B1 | 10/2007 | Sweatt | |
| 7,376,314 B2 | 5/2008 | Reininger | |
| 7,545,586 B2 | 6/2009 | Gohman | |
| 7,587,109 B1 | 9/2009 | Reininger | |
| 7,672,058 B2 | 3/2010 | Jiang | |
| 7,718,940 B2 | 5/2010 | Hirasawa | |
| 7,768,715 B2 | 8/2010 | Gohman | |
| 7,865,076 B2 | 1/2011 | Tamaki | |
| 7,974,015 B2 | 7/2011 | Toyoda | |

OTHER PUBLICATIONS

Smith, "Modern Optical Engineering", McGraw-Hill, 1990.
Land and Nilsson, "Animal Eyes", Oxford University Press, England 2002.

(Continued)

*Primary Examiner* — Mahidere Sahle

(57) ABSTRACT

A wide angle imaging system combines compound array fore-optics with single axis relay optics to generate distortion free images with an infinite depth of field. A curved first array of objective lenslets focuses multiple apertures of light through the tubes of a louver baffle terminated by field stops. A curved second array of field lenslets, positioned immediately after the field stops, passes the light beams through an array of pupil planes. A curved final array of erector lenslets refocuses the beams into a curved array of sub-images. The relay optics transform the curved array of sub-images into a flat final image that is contiguous. The fore-optics and relay optics are optimized concurrently to achieve much higher performance than is possible in either compound array optics or sequential optics. This is accomplished by varying the lenslet radii of the fore-optics in annular increments to compensate for aberrations introduced by the relay lenses.

20 Claims, 17 Drawing Sheets

(56) References Cited

OTHER PUBLICATIONS

Duparré et al., "Artificial Apposition Compound Eyes Fabricated by Micro-Optics Technology", Applied Optics, Aug. 2004, pp. 4303-4310, vol. 43, No. 22.

Lee and Szema, "Inspirations from Biological Optics for Advanced Photonic Systems", Science, Nov. 2005, pp. 1148-1150, vol. 310, No. 5751.

"AMTIR Glass Specification Sheets", Amorphous Materials Inc., Jan. 2011.

"Zemax Moldable Glass Catalog", Rochester Precision Optics, Feb. 2009.

"Sumita Molding and Optical Glass Data", Sumita Optical Glass Inc., Dec. 2010.

"Infrared Glass Specification Sheets", Vitron Coporation, 2007.

Edward Palik, "Handbook of Optical Constants of Solids", Elsevier, 1998.

FIGURE 3
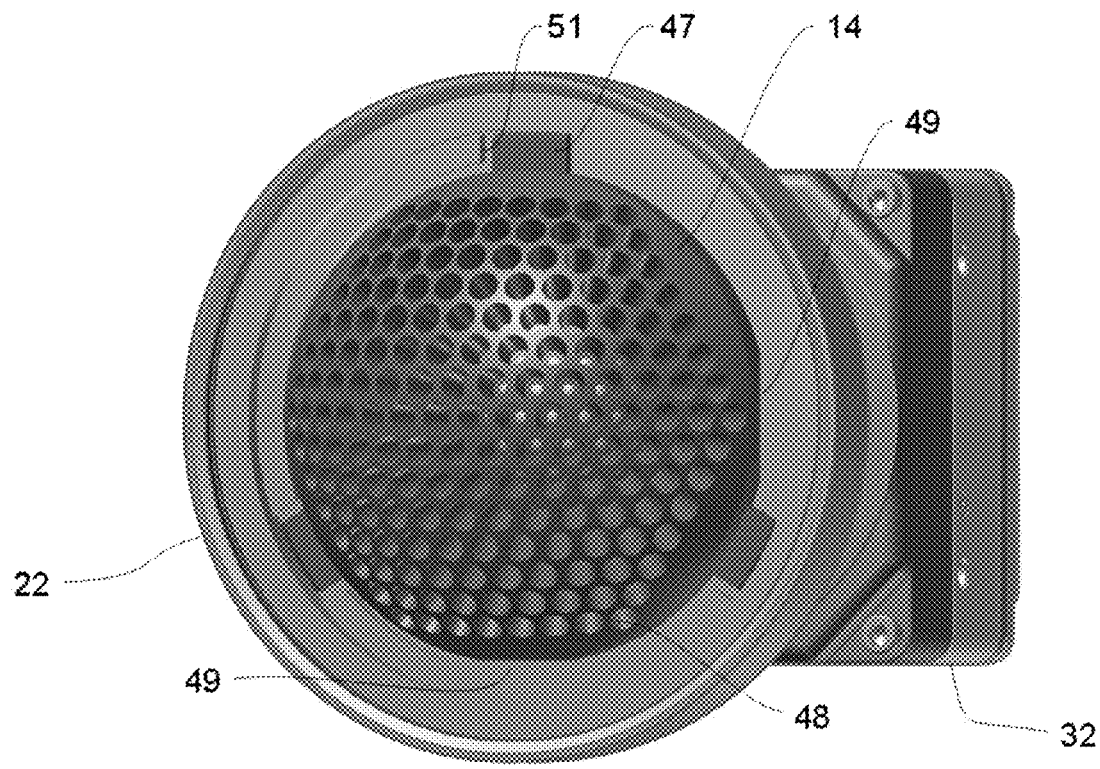
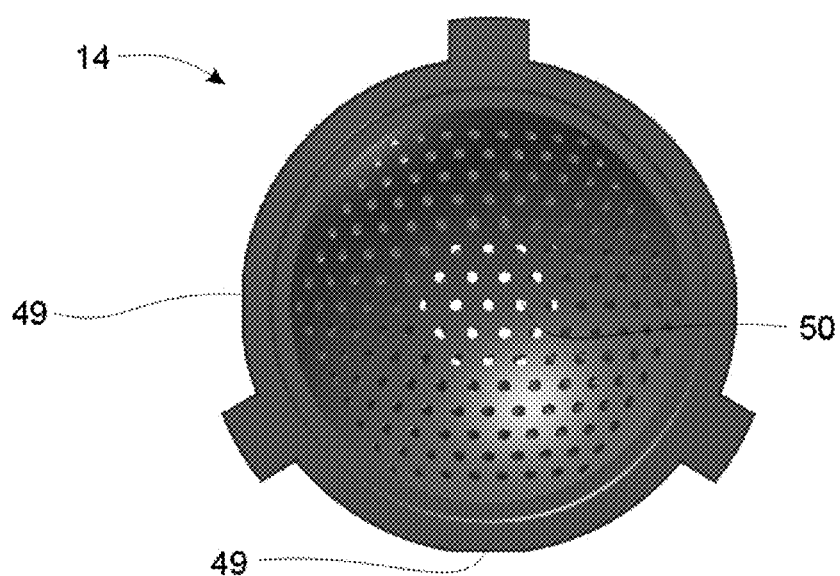

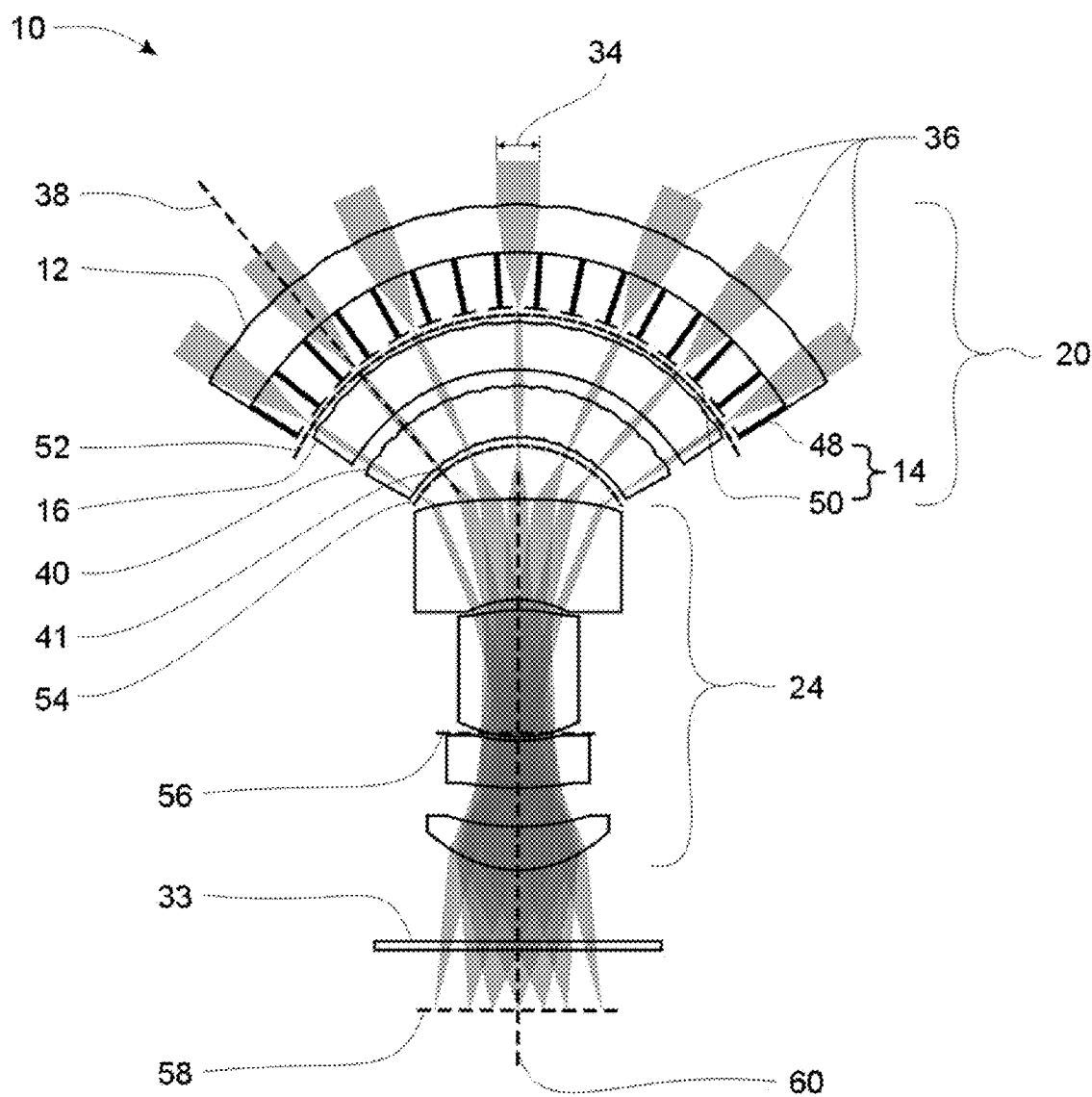

FIGURE 6a

| Optical System Parameters ||||||
|---|---|---|---|---|---|
| F-number: 1.3 | | | Field of View: 120 degrees ||||
| Focal Length: 4 mm | | | Ommatidia: 169 ||||
| Image Diameter: 13.93 mm | | | Wavelength: 7.5 - 12 microns ||||
| Optical Prescription for Compound Array Fore-Optic ||||||
| Part Reference: | 61 || 62 || 63 |
| Part Specification: | IG4 || AMTIR2 || IG6 |
| Refractive Index$_{10um}$: | 2.608430 || 2.769085 || 2.777472 |
| Part Reference: | 64 | 65 | 66 | 67 | 69 | 70 |
| Part Specification: | 25 mm | 21.6 mm | 16.8 mm | 13.4 mm | 12.3 mm | 8.9 mm |
| Part Reference: | 34 | | 73 | | 76 | 77 |
| Part Specification: | 3 mm | | 1.86 mm | | 1.66 mm | 1.2 mm |
| Part Reference: | 68 | 75 | 72 | | | |
| Part Specification: | 17.7 mm | 0.8 mm | 8.01826 deg | | | |

FIGURE 6b

| Optical Prescription for Compound Array Fore-Optic (continued) ||||||
| Zone | Surface | Radius (mm) | Conic | Coeff r⁴ | Coeff r⁶ | Coeff r⁸ |
|---|---|---|---|---|---|---|
| 85 | 78 | 6.937391 | -0.7362 | | | |
|  | 80 | 2.272602 |  | 1.11922 | -4.54615 | 9.53815 |
|  | 82 | 2.895602 | 2.5337 | | | |
|  | 83 | -17.42706 | | | | |
| 86 | 78 | 6.937391 | -0.7362 | | | |
|  | 80 | 1.613059 |  | -0.66287 | 2.50808 | -3.10108 |
|  | 82 | 2.809078 | -2.1224 | | | |
|  | 83 | -11.13557 | | | | |
| 87 | 78 | 6.937391 | -0.7362 | | | |
|  | 80 | 1.703430 |  | 0.37054 | 0.16220 | 0.75850 |
|  | 82 | 2.642704 | -5.7955 | | | |
|  | 83 | -13.83460 | | | | |
| 88 | 78 | 6.937391 | -0.7362 | | | |
|  | 80 | 1.808899 |  | -0.28727 | 1.17172 | -1.40112 |
|  | 82 | 2.322207 | -8.2378 | | | |
|  | 83 | -35.49439 | | | | |
| 89 | 78 | 6.937391 | -0.7362 | | | |
|  | 80 | 1.768007 |  | -0.22857 | 0.70517 | -0.70783 |
|  | 82 | 2.410671 | -4.3042 | | | |
|  | 83 | -250 | | | | |
| 90 | 78 | 6.937391 | -0.7362 | | | |
|  | 80 | 1.538404 |  | -0.51416 | 1.37406 | -1.25677 |
|  | 82 | 2.654056 | -0.1498 | | | |
|  | 83 | -250 | | | | |
| 100 | 78 | 6.937391 | -0.7362 | | | |
|  | 80 | 1.415986 |  | -0.69398 | 2.07489 | -2.19028 |
|  | 82 | 3.052702 | 6.0005 | | | |
|  | 83 | Infinity | | | | |
| 102 | 78 | 6.937391 | -0.7362 | | | |
|  | 80 | 1.434332 |  | -0.28626 | 0.54015 | -0.49283 |
|  | 82 | 2.707199 | 2.0953 | | | |
|  | 83 | Infinity | | | | |

FIGURE 7a

| Optical Prescription for Rear-Optic Relay ||||||
| Item | Glass | Thick (mm) | Radius (mm) | Coeff $r^4$ | Coeff $r^6$ | Coeff $r^8$ |
| --- | --- | --- | --- | --- | --- | --- |
| 91 | | 4.36 | | | | |
| 92 | Ge | 7.00 | 124.8197 | 5.5846e-4 | -1.2657e-5 | 1.2832e-7 |
| $n_{10um}$ | 4.003190 | 0.70 | 7.487158 | | | |
| 93 | AMTIR1 | 8.90 | 9.330468 | -1.8961e-3 | 9.8016e-5 | -5.6999e-6 |
| $n_{10um}$ | 2.498120 | 0.25 | -8.872214 | | | |
| 94 | Ge | 3.30 | -12.33631 | | | |
| $n_{10um}$ | 4.003190 | 2.70 | -17.84145 | 4.6571e-4 | 5.9842e-6 | -7.4624e-9 |
| 95 | IG4 | 3.00 | -19.47611 | | | |
| $n_{10um}$ | 2.608430 | 5.00 | -8.440351 | 6.6093e-5 | 2.9705e-7 | 5.1629e-9 |
| 33 | Silicon | 0.66 | Infinity | | | |
| $n_{10um}$ | 3.417762 | | Infinity | | | |
| 99 | | 4.21 | Infinity | | | |

FIGURE 9a

| Optical System Parameters ||||
|---|---|---|---|
| F-number: 1.8 | | Field of View: | 120 degrees |
| Focal Length: 2.231 mm | | Ommatidia: | 1027 |
| Image Diameter: 7.728 mm | | Wavelength: | 400 - 800 nm |

| Optical Prescription for Compound Array Fore-Optic |||||||
|---|---|---|---|---|---|---|
| Part Reference: | 61 || 62 || 63 ||
| Part Specification: | K-PFK90(M) || K-PSFN4(M) || K-LAFK50(M) ||
| Refractive Index$_d$: | 1.457283 || 1.839033 || 1.768170 ||
| Part Reference: | 64 | 65 | 66 | 67 | 69 | 70 |
| Part Specification: | 21.4 mm | 17.1 mm | 17.015 mm | 14.015 mm | 11.096 mm | 7.696 mm |
| Part Reference: | 34 | 73 | | 74 | 76 | 77 |
| Part Specification: | 1.245 mm | 1.0 mm | | 0.8 mm | 0.6 mm | 0.44 mm |
| Part Reference: | 68 | 75 | 72 | | | |
| Part Specification: | 12.2 mm | 0.4 mm | 3.33 deg | | | |

| Zone | Surface | Radius (mm) | Conic | Coeff $r^4$ | Coeff $r^6$ | Coeff $r^8$ |
|---|---|---|---|---|---|---|
| 85 | 78 | 2.957234 | -3.8435 | | | |
| | 79 | -1.181057 | | | | |
| | 80 | -1.517289 | 0.6409 | | | |
| | 81 | -2.364029 | | | | |
| | 82 | 0.651832 | | -1.08076 | 27.0303 | -227.804 |
| | 83 | -1.142593 | | -5.61073 | 148.719 | -1045.24 |
| 86 | 78 | 2.900386 | -4.3496 | | | |
| | 79 | -1.317173 | | | | |
| | 80 | -1.672348 | -0.3879 | | | |
| | 81 | -2.533011 | | | | |
| | 82 | 0.670599 | | 0.33733 | -12.0522 | 96.2644 |
| | 83 | -1.171413 | | -6.12053 | 113.125 | -406.393 |

FIGURE 9b

| Optical Prescription for Compound Array Fore-Optic (continued) |||||||
|---|---|---|---|---|---|---|
| Zone | Surface | Radius (mm) | Conic | Coeff $r^4$ | Coeff $r^6$ | Coeff $r^8$ |
| 87 | 78 | 2.662498 | -1.1949 | | | |
|    | 79 | -2.148060 |         | | | |
|    | 80 | -2.190096 | -1.1053 | | | |
|    | 81 | -3.849194 |         | | | |
|    | 82 | 0.635180  |         | -0.16320 | -3.61466 | 10.7741 |
|    | 83 | -0.665183 |         | 1.00713  | 0.19633  | -6.60555 |
| 88 | 78 | 2.458162  | -0.9456 | | | |
|    | 79 | -1.444464 |         | | | |
|    | 80 | -1.350337 | -0.3143 | | | |
|    | 81 | -2.507436 |         | | | |
|    | 82 | 0.625395  |         | -0.00439 | -6.79174 | 22.9526 |
|    | 83 | -0.680303 |         | 2.15156  | -19.0081 | 90.1212 |
| 89 | 78 | 3.109275  | -1.9678 | | | |
|    | 79 | -1.798461 |         | | | |
|    | 80 | -2.404744 | 1.3977  | | | |
|    | 81 | -3.389788 |         | | | |
|    | 82 | 0.562163  |         | -0.35807 | -7.18173 | 27.7144 |
|    | 83 | -0.726673 |         | 1.82495  | -23.0601 | 123.080 |
| 90 | 78 | 2.551557  | -0.5208 | | | |
|    | 79 | -1.673956 |         | | | |
|    | 80 | -1.594838 | 0.5323  | | | |
|    | 81 | -2.580313 |         | | | |
|    | 82 | 0.596413  |         | -0.57041 | -1.80934 | 4.32098 |
|    | 83 | -0.753846 |         | 0.16015  | -1.2927  | 21.0300 |
| 100 | 78 | 2.391643 | -0.4904 | | | |
|     | 79 | -1.343834 |         | | | |
|     | 80 | -1.222359 | -0.1181 | | | |
|     | 81 | -2.414308 |         | | | |
|     | 82 | 0.634746  |         | -0.22240 | -1.23418 | -4.21350 |
|     | 83 | -0.799624 |         | -2.00658 | 28.4491  | -120.627 |

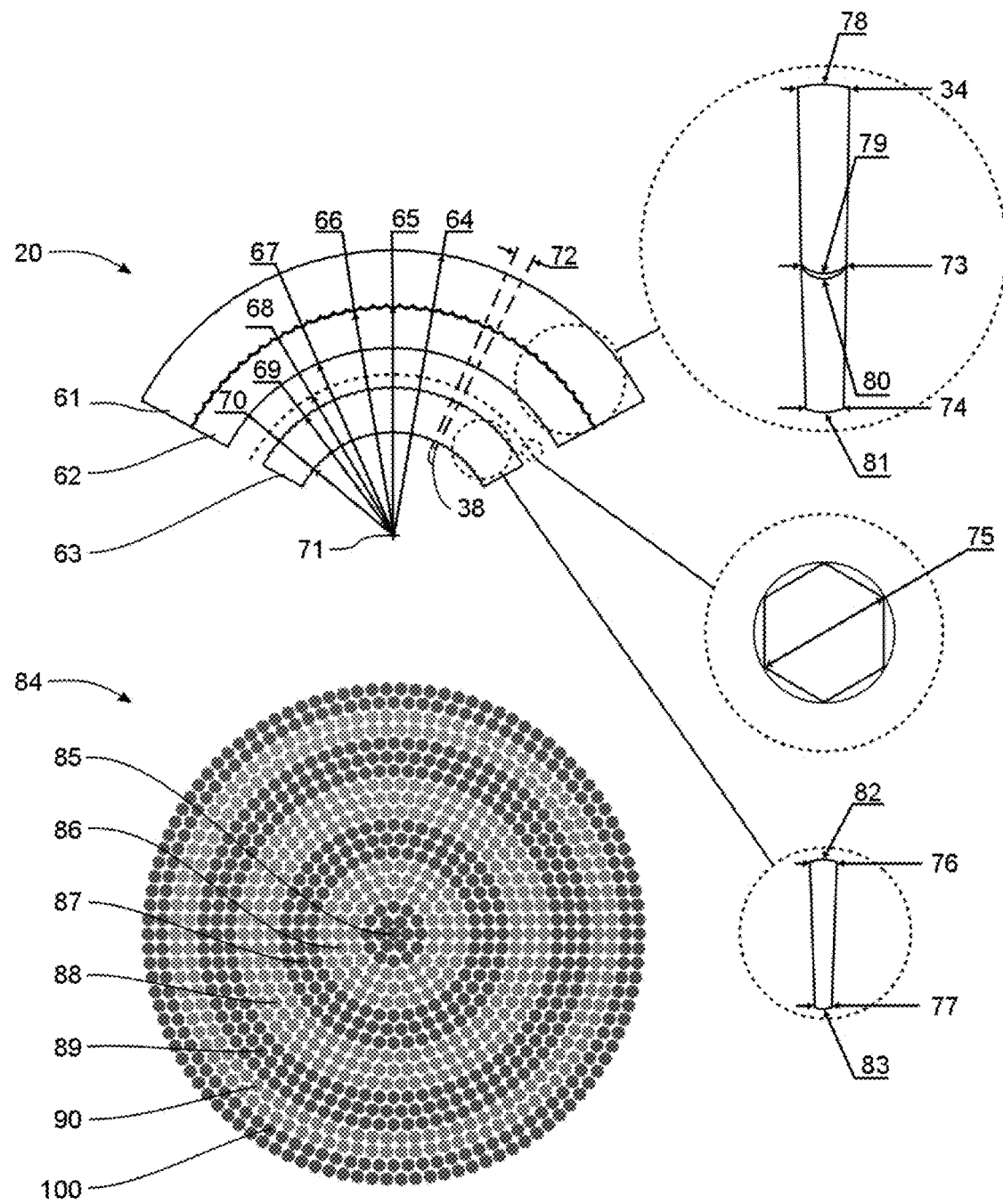

FIGURE 10a

| \multicolumn{7}{c|}{Optical Prescription for Rear-Optic Relay} |
|---|---|---|---|---|---|---|
| Item | Glass | Thick (mm) | Radius (mm) | Conic | Coeff $r^4$ | Coeff $r^6$ | Coeff $r^8$ |
| 91 | | 2.9197 | | | | | |
| 92 | K-LAFK50(M) | 1.3654 | 27.35704 | | 2.7984e-4 | -1.8294e-6 | 7.9949e-9 |
| | | 2.1615 | 4.445151 | -0.7523 | | | |
| 93 | N-FK51(M) | 1.0 | 98.65035 | 276.29 | | | |
| | | 0.7766 | 11.51272 | | -1.9483e-3 | -7.9014e-5 | 1.8549e-6 |
| 94 | SF57(M) | 5.6711 | -12.46279 | 3.0370 | | | |
| | | 0.01 | -69.68143 | 218.02 | | | |
| 95 | H-ZLAF53(M) | 4.4829 | 6.42902 | -0.1883 | | | |
| | | 0.01 | 6.11460 | 6.0892 | | | |
| 96 | K-PFK90(M) | 2.1279 | 2.95156 | | -3.4590e-3 | 1.5317e-4 | -1.5979e-4 |
| | | 0.01 | -2.82943 | -0.4330 | | | |
| 97 | TAF1(M) | 0.7 | -3.84149 | | -3.5478e-3 | -2.5270e-4 | 1.7880e-4 |
| | | 0.01 | -38.00456 | -363.34 | | | |
| 98 | K-PFK80(M) | 2.2692 | 6.14958 | | 2.8380e-3 | -6.1470e-5 | 2.2787e-5 |
| | | | -3.50980 | | 5.7089e-3 | 4.0359e-4 | 8.9671e-5 |
| 99 | | 4.4 | Infinity | | | | |

MULTIHYBRID ARTIFICIAL COMPOUND EYE WITH VARIED OMMATIDIA

RELATED APPLICATIONS

The present application is a continuation-in-part application of U.S. provisional patent application Ser. No. 61/370,084, filed Aug. 2, 2010, for MULTIHYBRID ARTIFICIAL COMPOUND EYE WITH VARIED OMMATIDIA, by Francis Mark Reininger, included by reference herein and for which benefit of the priority date is hereby claimed.

FIELD OF THE INVENTION

The present invention relates to wide angle imaging systems and, more particularly, to high resolution multiple aperture wide angle imaging systems with lenslet arrays coupled to sequential, single element lenses.

BACKGROUND OF THE INVENTION

Conventional camera optics are derived from the eyes of vertebrates, wherein a single lens system captures light through a large aperture and focuses it onto a concave retina. Single aperture optics have the advantage of good spatial resolution and efficient light capture, but they are disadvantaged by their relatively large size and limited field of view. Vertebrates evolved to overcome the field of view limitation by gimbaling the eye in its socket, and by restricting the high resolution capability to the fovea centralis. Camera developers have attempted to extend the high resolution capability beyond the fovea by introducing additional optical elements to reduce the distortion that results from focusing an inherently concave image onto a flat film surface. The classical solution of adding spherically shaped optical elements does not eliminate distortion, and it yields a lens that is heavy and long. An example of a classical high resolution, wide angle lens is described by Momiyama in U.S. Pat. No. 4,437,735. The lens extends 20 inches beyond the image plane and uses 13 powered optical elements of different sizes, shapes, and materials to correct for aberrations. A modern approach, described by Gohman and Peterson in U.S. Pat. Nos. 7,545,586 and 7,768,715, is to introduce aspheric elements and an intermediate image, which unfortunately retains a slight concavity. Though this design form improves performance while reducing distortion to an acceptable level at the final image plane, it can still require more than a dozen powered optical elements.

The excessive use of aspheric surfaces in modern wide angle systems highlights a fundamental contradiction in conventional optical design principles: Aberrations increase exponentially as the field angle and pupil size increase laterally away from the central optical axis; designers can only correct for these laterally induced aberrations indirectly by adding and altering optical surfaces sequentially along the central optical axis. It will be shown that this design contradiction can be overcome by adding optical surfaces laterally away from the central optical axis. This enables the designer to optimize in discrete increments along multiple axes to correct for the laterally induced aberrations directly.

Another disadvantage of the high resolution, single aperture lens is its need for focus adjustment to image objects at different distances. The problem is especially acute at close range and has prompted inventors to adopt various schemes to automate the focus adjustment process. One example of an auto focus system is described by Watanabe et al. in U.S. Pat. No. 7,184,090. It engages in a focusing operation while sending out an image capturing signal. It then settles on the focus position that achieves the highest value in image contrast. As with all such auto focusing schemes, it cannot overcome the inherent design limitation of a single aperture lens: Objects at different depths of field cannot be brought into focus simultaneously.

Wide angle single aperture lens systems are also unable to generate images with uniform intensity. The image intensity generally degrades with field angle as the cosine to the fourth power when viewing a flat target. Thus, the image intensity at 60 degrees off-axis is less than 7% of the image intensity at 0 degrees. Optical designers routinely attempt to overcome this inherent limitation by oversizing and distorting the entrance pupil for the off-axis fields while positioning a second pupil plane far back in the system to serve as the aperture stop and iris. A double pupil plane design can limit the intensity degradation to about 50% but cannot eliminate the problem entirely.

Single aperture lens systems are inherently prone to stray light degradation, even when designed with an intermediate field stop. The stray light is generated by intense, out-of-view radiation striking the first optical surface and scattering toward the final image plane. Since the front surface of the first lens is visible from every point on the image plane, the scattered radiation cannot be blocked. Space craft mounted star trackers have attempted to deal with this problem by using very long baffles to limit the sun's illumination angle. However, even with the extended baffle, the best systems are restricted to tracking stars that are more than 30 degrees off-axis from the solar line of sight. Stars that fall within the 30 degree sector are not bright enough to overcome the solar stray radiation and cannot be tracked.

There is the need in many autonomous surveillance and robotic navigation applications for a high resolution, wide angle imaging system that remains in focus through all depths of field, that is impervious to stray light, and that generates a distortion free image with uniform intensity. Such a system can be derived from the most popular eyes found in nature, the multiple aperture compound eyes of arthropods (i.e. insects and crustaceans). Compound eyes are formed from a convex array of micro-lenses (or lenslets) that collectively capture light through a very large field angle. The inherent advantage is that each sector of the field is separated into tiny zones that are imaged independently through lenslets positioned in the direction of the incoming image light. Since the aperture diameter and field angle of each lenslet are small, the corresponding optical aberrations are small. Since each aperture is oriented along its own optical axis pointing toward its own target sector, the image intensity remains uniform from aperture to aperture across the entire field of view. The composite image generated by the array of lenslets is distortion free and remains in focus at all depths of field because each lenslet captures a very small section of the optical wavefront emanating from the object. The smaller the wavefront sections, the flatter they become until all objects appear to be at infinity. This is why arthropods have no need for a focusing mechanism.

Natural compound eyes can be divided into two general categories: apposition and superposition. In the apposition eye a simple corneal lenslet focuses light directly onto a nearby receptive rod called a rhabdom. The two components constitute an ommatidium, of which there are thousands. Only a small cone of light along the axis of each ommatidium is detected. Light entering from outside the cone angle is absorbed in surrounding pigment cells. The spherical layout of the array enables adjoining lenslets to view adjacent fields.

Though each lenslet image is inverted, in mosaic form the composite image appears erect because the lenslet viewing sectors are so small.

The architecture of the superposition eye varies slightly from that of the apposition eye. The superposition eye includes a meniscus shaped shell of long crystalline cones, a clear zone, and a convex rhabdom layer separated from the cones by a distance equal to half the radius of curvature of the outer meniscus surface. The cornea of each crystalline cone focuses incoming light within the cone and then collimates it in the latter part of the cone. The cone therefore acts as both a Keplerian telescope objective and an afocal eyepiece. Since the array of cones form a meniscus structure, the collimated light of a common field angle converge from adjoining cones to a single point on the confocal contour of the rhabdom layer. Thus the light from all of the cones separate according to field angle and then superpose on the rhabdom surface to produce a single, upright image. The superposition eye is a true pupil imager because the beam convergence points on the rhabdom surface are actually tiny exit pupils. Since light from a large number of cones contribute to each of these convergence points, the effective sensitivity of a superposition eye is increased significantly relative to an apposition eye. This is why apposition eyes are found primarily on diurnal arthropods, such as butterflies, and superposition eyes are found primarily on nocturnal arthropods, such as moths.

Despite the inherent light capturing advantages of the superposition architecture, artificial compound eyes are more commonly derived from the much simpler apposition format. Duparré et al. describe a flat lenslet array artificial compound eye the size and shape of a credit card (see Duparré et al., Applied Optics, August 2004, pp 4303-4310, vol. 43, No. 22). Hirasawa et al. describe another flat array variation in U.S. Pat. No. 7,718,940, as do Tamaki et al. in U.S. Pat. No. 7,865,076. The flat design attribute is beneficial in that it enables the use of flat lenslet arrays, which are routinely manufactured in a variety of ways (see for example Fadel et al., U.S. Pat. No. 6,967,779). The flat design also matches well to flat mosaic detector arrays, which are easy to manufacture and readily available. However, the flat design attribute limits the field of view and causes the image intensity to degrade significantly with field angle. Toyoda et al., in U.S. Pat. No. 7,974,015, describe a method for overcoming these limitations using prisms to redirect light into the flat lens array from oblique angles. Another variation of a flat lenslet array system is described by Gurevich et al. in U.S. Pat. No. 7,187,502. This system uses a second flat lenslet array of a different pitch to increase the magnification of the image. In all these designs, some method of signal processing is required to rearrange the sub-images into a more coherent full image.

Lee and Szema describe an artificial apposition array compound eye that closely mimics the design found in nature (see Lee and Szema, Science, November 2005, pp 1148-1150, vol. 310, No. 5751). The lenslet array is convex in shape, and the right from each lenslet is focused onto a convex surface. Unfortunately, the design requires a convex shaped detector array of extremely small size to capture the image.

Another curved apposition compound eye concept is described by Sweatt and Gill in U.S. Pat. No. 7,286,295. In this concept the lenslets have power on two surfaces and are preferred to be aspheric to correct for optical aberrations. The lenslets are made from polymethyl methacrylate and are optimized for a single wavelength. The lenslets are separated laterally along the array by a spacer baffle that prevents crosstalk between cells. The lenslets focus a series of inverted sub-images onto a dome shaped, coherent fiber optic bundle that is supposed to transport the sub-images onto a flat detector array. However, the fiber optic bundle is not tapered, and so the fiber tips are beveled along the peripheral regions of the dome. The bevels prevent light capture along the axes of the peripheral lenslets and encourage stray light capture from oblique angles. Gaps and overlaps in the sub-images are controlled by the spacing of the lenslets and the curvature of the array. Since the sub-images are each inverted, the composite image must be constructed digitally by post-processing.

A curved apposition compound eye free of fiber optics is described by Jiang and Dong in U.S. Pat. No. 7,672,058. They incorporate microfluidic devices into the array to tune the focal lengths of each lenslet in response to a variety of environmental factors. The adjustable focal length appears to compensate for the variation in distance to the flat focal plane surface.

An artificial superposition array compound eye is described in U.S. Pat. No. 7,376,314. In this concept two lenslet arrays are hot press molded into a convex, meniscus form. The lenslets are paired to operate as afocal Keplerian telescopes that focus, collimate, and bend the incoming light. The mensicus form enables the collimated light from adjacent lenslets to be directed toward a common point on the convex surface of a fiber optic imaging taper. In this manner all of the lenslets work together to form a single, upright, high intensity image on top of the taper. The taper transfers the upright image to a flat detector array; no digital post-processing is required. The fiber tips of the taper are each cut perpendicular to the fiber axes, so only image light from the correct angles are captured by the fibers. A honeycomb louver baffle is positioned between the lenslets and the taper dome to block ghost images. The diameter of the honeycomb cells set the effective pupil size of the optics. A typical cell diameter encompasses 100 lenslets out of the 30,000 lenslets in each array, thereby increasing its sensitivity by a factor of 100 over an equivalent apposition eye.

A hybrid superposition-apposition artificial compound eye is described in U.S. Pat. No. 7,587,109. Since hybrid compound eyes are not found in nature, the design architecture had to be invented from first principles. The hybrid combines the sensitivity of the superposition eye with the resolution of the apposition eye, and it generates a single, upright image without the need for post-processing. The invention makes use of a honeycomb field stop baffle to block stray light and ghost images, and it uses a fiber optic taper dome to transfer the convex image onto a flat detector array.

The main shortcoming in the hybrid superposition-apposition artificial compound eye is its reliance on the fiber optic taper dome to generate a flat image. Fiber optics increase the system cost, limit the minimum detector pixel pitch, and prevent the optics from being mounted directly to camera bodies designed for conventional lenses. With regard to cost, it is well known that assembling millions of fibers into a taper is labor intensive, and bonding the taper to a detector array is a highly skilled art. The taper must be bonded carefully to an active detector within a fixture that enables the technician to view the image while rotating the taper. The technician must rotate the taper to eliminate all moire interference patterns and then cure the bonding material to fix the taper in place.

The moire interference problem limits the ultimate size of the detector pixel. Two fibers must fit across each pixel to eliminate moire, and the fibers must be larger than about 3 microns to preserve light transfer efficiency. This implies that the pixel pitch must be greater than 6 microns. Since optical size and resolution performance scale with pixel pitch, the 6 micron pitch becomes the ultimate limit in size reduction and resolution. The most advanced detector arrays now have pixels approaching 1.1-1.4 microns in pitch, which implies that the fibers must be about 0.5 microns in diameter to eliminate moire. It is unlikely that fibers can be manufactured reliably at this diameter. Certainly waveguide effects in these fibers would limit light transfer through the taper since the uncladded core diameter of the fiber would be smaller than the wavelength of light.

Fused fiber optic tapers are not available in infrared materials, which limits the wavelength range of the optics. Even if infrared transmitting tapers were available, they could not be bonded to uncooled, infrared micro-bolometer arrays because they would damage the bolometer structure. It would also be unwise to bond tapers to expensive, cooled infrared detector arrays due to the risk of damaging the passivation layer beneath the contact surface.

It is therefore concluded that a more useful artificial compound eye is one that does not rely on fiber optics to transform a convex image into a flat image. A new design concept must be invented that preserves the inherent advantages of artificial compound eyes while incorporating a versatility that enables the new optics to mount directly onto conventional camera bodies.

U.S. PATENT DOCUMENTS

| | | |
|---|---|---|
| 4,357,088 | Nov. 2, 1982 | Pomerantzeff |
| 4,437,735 | Mar. 20, 1984 | Momiyama |
| 6,449,103 | Sep. 10, 2002 | Charles |
| 6,571,043 | May 27, 2003 | Lowry |
| 6,898,015 | May 24, 2005 | Yoshikawa |
| 6,933,167 | Aug. 23, 2005 | Yamamoto |
| 6,942,959 | Sep. 13, 2005 | Dubin |
| 6,967,779 | Nov. 22, 2005 | Fadel |
| 7,106,529 | Sep. 12, 2006 | Kerr |
| 7,119,962 | Oct. 10, 2006 | Gurevich |
| 7,184,090 | Feb. 27, 2007 | Watanabe |
| 7,187,502 | Mar. 6, 2007 | Gurevich |
| 7,217,573 | May 15, 2007 | Oshida |
| 7,286,295 | Oct. 23, 2007 | Sweatt |
| 7,376,314 | May 20, 2008 | Reininger |
| 7,545,586 | Jun. 9, 2009 | Gohman |
| 7,587,109 | Sep. 8, 2009 | Reininger |
| 7,672,058 | Mar. 2, 2010 | Jiang |
| 7,718,940 | 18/5/2010 | Hirasawa |
| 7,768,715 | Aug. 3, 2010 | Gohman |
| 7,865,076 | Apr. 1, 2011 | Tamaki |
| 7,974,015 | May 7, 2011 | Toyoda |

OTHER PUBLICATIONS

Smith, "Modern Optical Engineering", McGraw-Hill, 1990.
Land and Nilsson, "Animal Eyes", Oxford University Press, 2002.
Duparré et al., "Artificial Apposition Compound Eyes Fabricated by Micro-Optics Technology", Applied Optics, August 2004, pp 4303-4310, vol. 43, No. 22.
Lee and Szema, "Inspirations from Biological Optics for Advanced Photonic Systems", Science, November 2005, pp 1148-1150, vol. 310, No. 5751.
"AMTIR Glass Specification Sheets", Amorphous Materials Inc., January 2011.
"Zemax Moldable Glass Catalog", Rochester Precision Optics, February 2009.
"Sumita Molding and Optical Glass Data", Sumita Optical Glass Inc., December 2010.
"Infrared Glass Specification Sheets", Vitron Corporation, 2007.
Edward Palik, "Handbook of Optical Constants of Solids", Elsevier, 1998.

SUMMARY OF THE INVENTION

In accordance with the present invention, there is provided a multiple aperture imaging system formed from a hybrid superposition-apposition compound array fore-optic linked to a relay of sequential, single element lenses. The fore-optic hybrid combines the high sensitivity attribute of superposition arrays with the high resolution attribute of an apposition array. In the superposition section a convex shaped array of Keplerian telescope objectives divides and focuses the incoming light into a series of beams that are channeled through the tubes (or hollow light conduits) of a louver baffle. The baffle is terminated by a field stop array that separates the focused light into curved sub-images, which are inverted. The size and shape of the sub-images are determined by the size and shape of the field stops. Positioned immediately after the field stops is a convex shaped array of field lenslets that reverses the field angles of the beams and passes them through an array of pupil planes. The beams are then refocused with an apposition array of erector lenslets to form a curved second array of upright sub-images. The sub-images are centered about the ommatidial axes of their respective coaxial lenslets and field stops; the ommatidial axes converge at a common nodal point which is the center of curvature of the arrays.

The apposition array is coupled to the sequential lenses of the rear-optics relay to form a second hybrid. The function of the second hybrid is to transform the curved second array of sub-images into a flat final image. The hybridization coupling requires the apposition array to be designed to orient its ommatidial chief rays toward the first hybrid's center of curvature (or nodal point). This ensures that the chief rays are nearly perpendicular to the contour of the second array of sub-images, which resembles a Petzval surface, though it is not necessarily paraboloidal. The sequential lenses are then designed to cross the chief rays. If the crossing occurs at a plane, then an iris or a cold Lyot stop can be inserted there. The final image is flat and contiguous, but it is inverted as in a conventional, single aperture eye or camera.

The two hybrids can be optimized concurrently to achieve much higher performance than is possible in either compound array optics or sequential optics. This is accomplished by arranging the ommatidia of the first hybrid in concentric rings about the central axis of the second hybrid. The axial symmetry enables the lenslet radii to be varied in annular increments to compensate for aberrations introduced by the lenses in the second hybrid. The field stop sizes within the louver baffle of the first hybrid are also adjusted during optimization to ensure that the final sub-images are conjoined properly. This eliminates the need for post-processing to produce a uniform, contiguous image.

OBJECTS OF THE INVENTION

It is an object of the invention to provide a system for generating high resolution, wide angle images without distortion.

It is another object of the invention to enable imaging at any depth of field without the need for focus adjustment.

It is another object of the invention to combine curved superposition and apposition lenslet arrays with sequential, single element lenses to create a flat, contiguous, and uniform intensity optical image without the need for post-processing.

It is another object of the invention to demonstrate a method for reducing optical aberrations by varying the lenslet surface shapes in annular increments away from the central optical axis while varying the lens surface shapes in sequential increments along the central optical axis.

It is another object of the invention to provide wide angle viewing for robotic systems to measure the optical flow field for autonomous navigation.

It is another object of the invention to provide designs of curved, refracting lenslet arrays that can be manufactured by precision hot press molding, injection molding, or diamond machining (diamond turning or diamond micro-milling).

It is another object of the invention to provide a louver baffle with field stops to enable a contiguous, uniform intensity image to be formed without stray light and ghost images.

It is another object of the invention provide an optical concept that can be designed for operation within any wavelength band from the ultra violet to the thermal infrared.

It is another object of the invention to provide an optical system that can be mounted directly to a conventional camera body.

It is another object of the invention to provide a design that enables modification of the sequential, single element lenses to accommodate different camera systems without requiring any modification of the compound array optics.

It is another object of the invention to provide an optical system that can be mounted directly to an image intensified eyepiece system.

It is another object of the invention to provide a design that enables a zoom capability from within the sequential, single element lenses.

It is a further object of the invention to provide an optical system that can be shaped conformally to any mounting surface geometry, whether it be flat, spherical, aspherical, or toroidal.

BRIEF DESCRIPTION OF THE DRAWINGS

A complete understanding of the present invention may be obtained by reference to the accompanying drawings, when considered in conjunction with the subsequent, detailed description, in which:

FIG. 3 is a front perspective view of a mounted louver baffle of the type illustrated in FIG. 1 and a back view showing the louver baffle field stop array;

FIG. 5 is a schematic cross-sectional view of a multihybrid artificial compound eye with varied ommatidia of the type illustrated in FIG. 1;

FIG. 6*a* is a table listing the optical prescription for a hybrid superposition-apposition compound array fore-optic of the type illustrated in FIG. 1;

FIG. 6*b* is an is a continuation of the table listing the optical prescription for a hybrid superposition-apposition compound array fore-optic of the type illustrated in FIG. 1;

FIG. 7*a* is a table listing the optical prescription for a rear-optic relay of the type illustrated in FIG. 1;

FIG. 9*a* is a table listing the optical prescription for a hybrid superposition-apposition compound array fore-optic of the type illustrated in FIG. 8;

FIG. 9*b* is an is a continuation of the table listing the optical prescription for a hybrid superposition-apposition compound array fore-optic of the type illustrated in FIG. 8;

FIG. 9*c* is a schematic cross-sectional diagram depicting the components of the optical prescription listed in FIGS. 9*a* and 9*b*;

FIG. 10*a* is a table listing the optical prescription for a rear-optic relay of the type illustrated in FIG. 8;

For purposes of clarity and brevity, like elements and components will bear the same designations and numbering throughout the Figures.

DESCRIPTION OF THE PREFERRED EMBODIMENT

Figure 1:
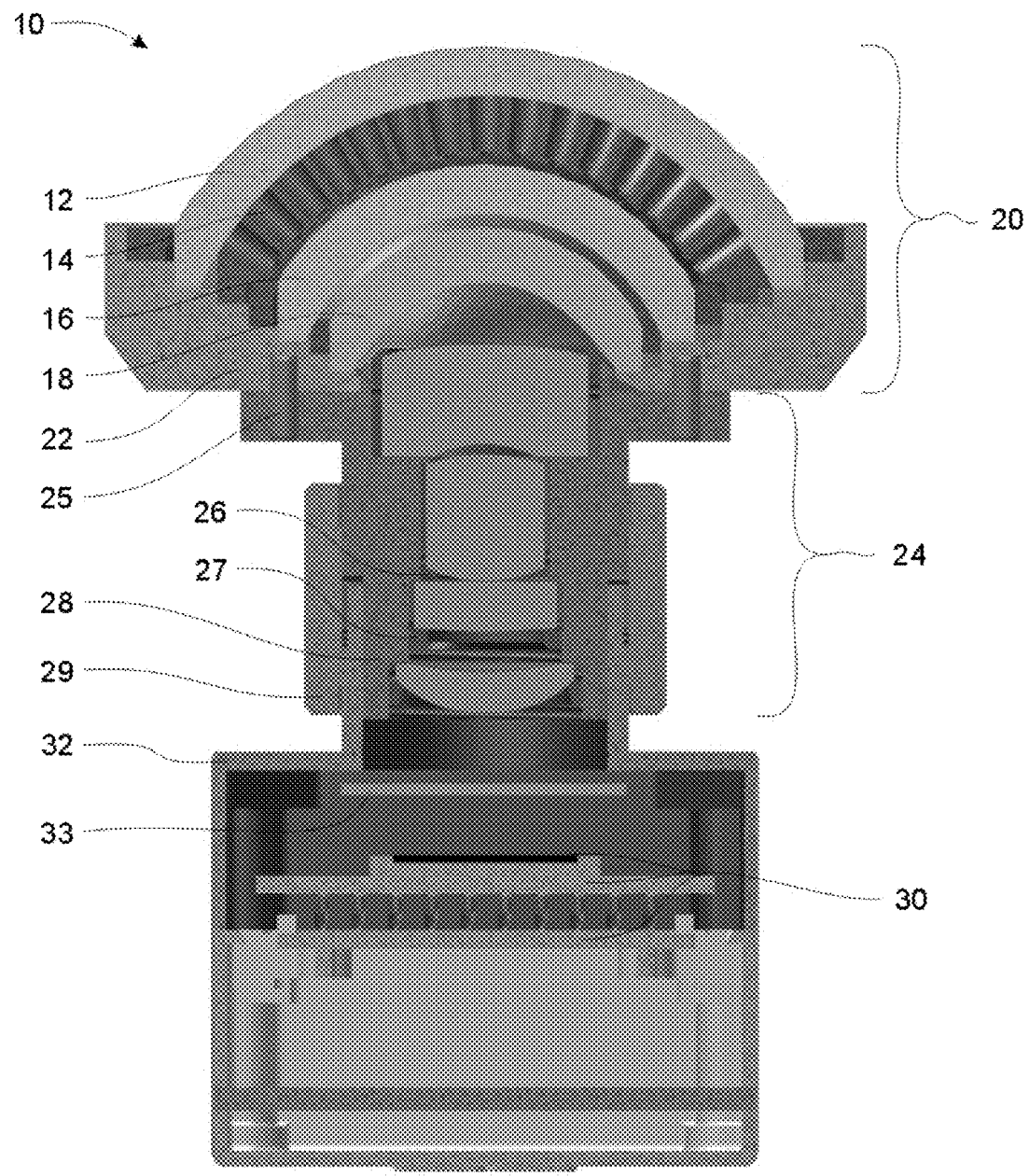
FIG. 1 is a cross-sectional view of a multihybrid artificial compound eye with varied ommatidia constructed in accordance with one embodiment of the invention.
Figure 2:
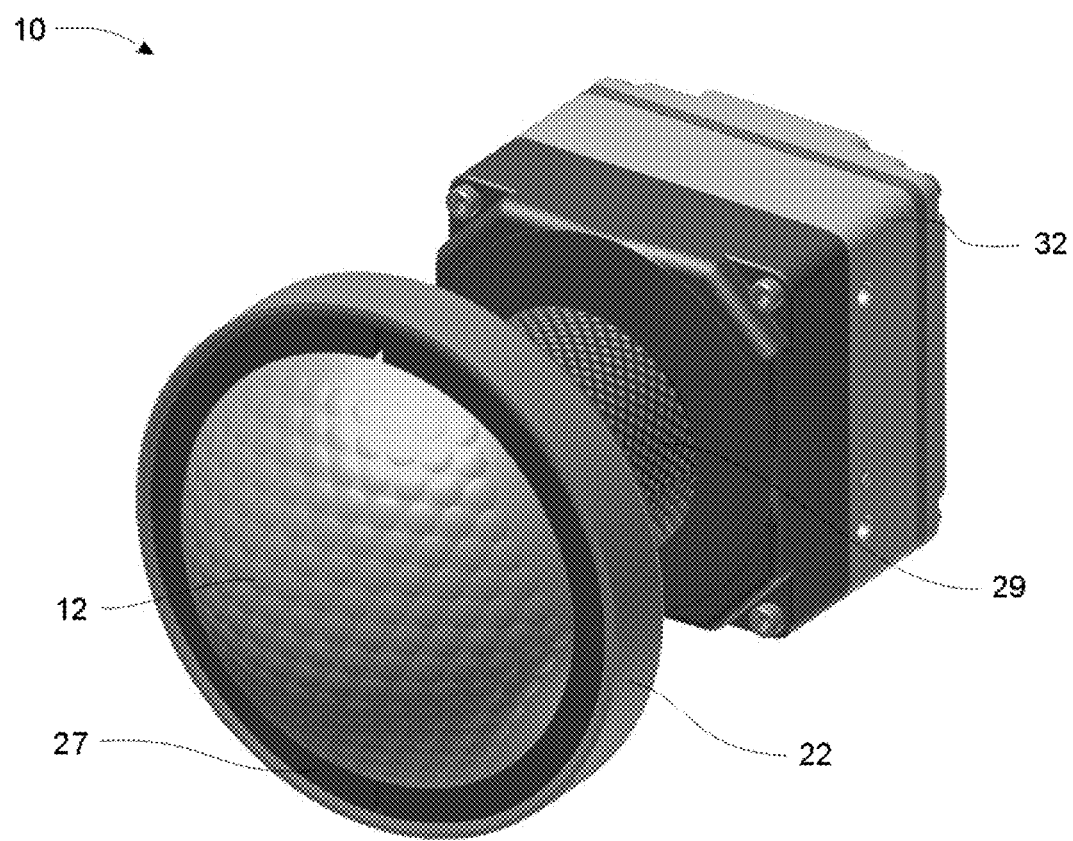
FIG. 2 is a front perspective view of a multihybrid artificial compound eye with varied ommatidia of the type illustrated in FIG. 1.

Referring now to the drawings, FIG. 1 is a cross-sectional view of a multihybrid artificial compound eye 10 constructed in accordance with one embodiment of the invention, and FIG. 2 is a front perspective view of the same system. The optics are divided into a hybrid superposition-apposition compound array fore-optic 20 and a rear-optic relay 24. The fore-optic includes an objective lenslet superposition array 12, a louver baffle 14, a field lenslet superposition array 16, and an erector lenslet apposition array, 18, all held rigidly in alignment by a fore-optic mounting structure 22. Each lenslet array is shaped conformally to a positive meniscus base with curvatures that are concentric. Each positive meniscus base is held in place by a retaining ring 27.

The rear-optic includes several conventional lens elements and an aperture stop that can be an iris 26, all held rigidly in alignment by a rear-optic mounting structure 28. Each lens element is held in place by a retaining ring 27. The rotational orientation of the fore-optic is aligned to the rear-optic using two dowel pins 25. A focus wheel 29 is used to link the rear-optic mounting structure 28 to the electronics mounting structure 32, which supports a mosaic detector array with readout electronics 30. The readout electronics convert the image captured by the detector array into voltages that are amplified by analog electronics and digitized by analog to digital converter electronics. In this embodiment of the invention the detector array is an infrared microbolometer array that is similar in design to the Tau 640 manufactured by FLIR Systems Corporation. The microbolometer array is vacuum sealed behind a window 33.

FIG. 3 shows how the louver baffle 14 is mounted into the fore-optic mounting structure 22 and maintained in alignment. It also provides a view of the back side of the baffle to reveal the louver baffle field stop array 50. The louver baffle 14 is shaped into a positive meniscus form that is concentric to the base curvatures of the lenslet arrays. The convex surface of the baffle conforms exactly to the concave surface of the objective superposition array to which it is in contact. The contact is maintained by the pressure from three set screws that each push against the back of a baffle mounting tab 47. Each tab fits into a mounting flange recess 51 below the base of the superposition array. The rotational orientation of the baffle is aligned to the lenslet array by a pair of orthogonal alignment flats 49 built into the baffle and each lenslet array. There are matching alignment flats 49 machined into the fore-optic mounting structure 22 to maintain the proper orientation.

Figure 4:
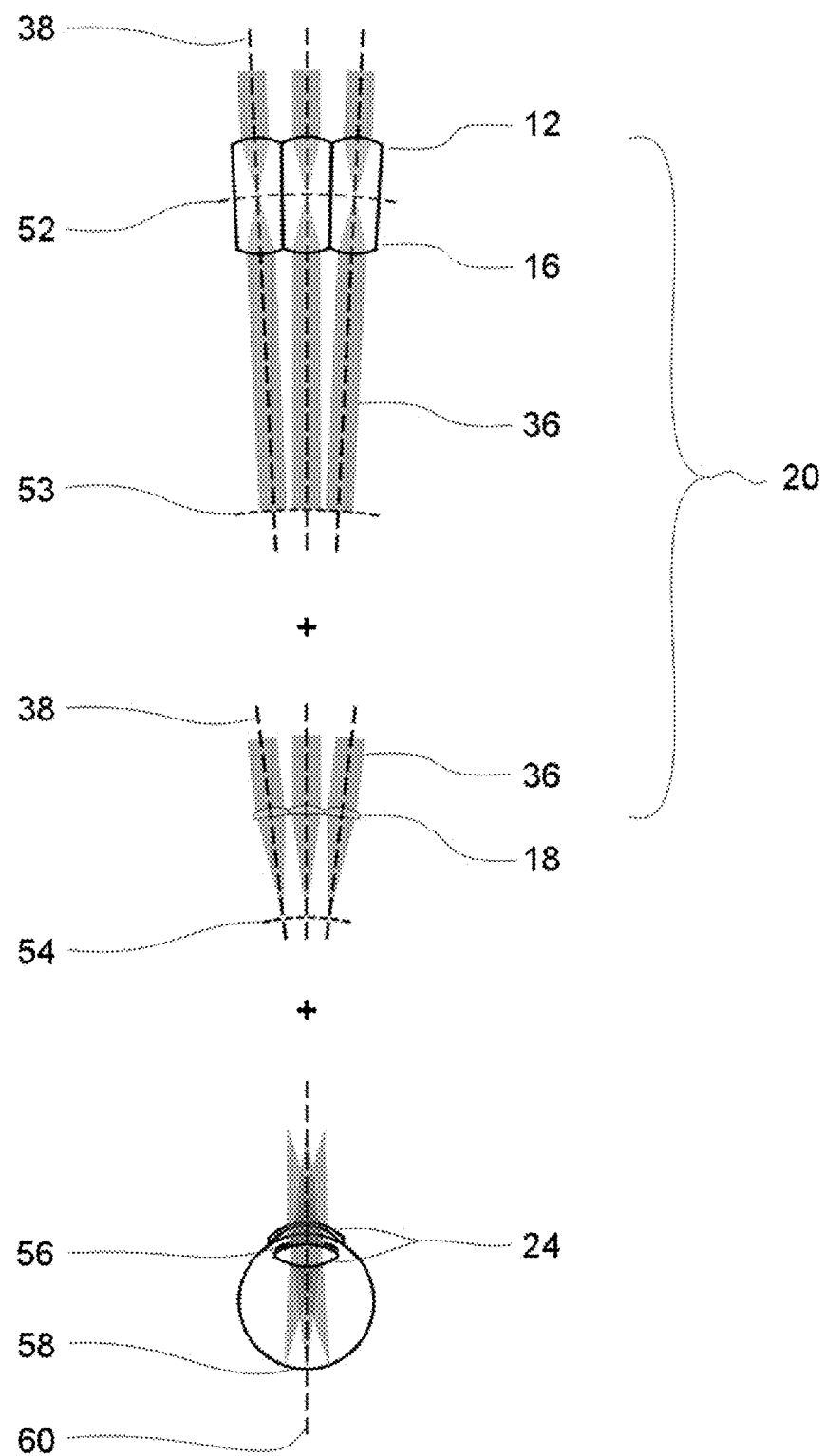
FIG. 4 is a schematic cross-sectional illustration of the multihybrid linkage between arthropod superposition and apposition compound eyes and a single chamber vertebrate eye.

FIG. 4 illustrates conceptually how the fore-optic and rear-optic described in FIG. 1 are brought together optically to form a multihybrid system. The first hybrid is, created by linking together superposition and apposition arrays derived from arthropod eyes. The linkage occurs at the intermediate pupil array 53, which is the exit pupil of the superposition array and the entrance pupil of the apposition array. The second hybrid is created by linking together the apposition array and a relay derived from single chamber, vertebrate eyes. This linkage occurs at the second image array 54 generated by the apposition array when it focuses the ommatidial light beams 36. To ensure proper coupling between the two systems, each ommatidial axis 38 of the compound array must merge into a single optical axis of the rear-optic relay 60. This is accomplished by shifting the intermediate pupil array 53 to a position that enables the ommatidial chief rays to be oriented toward the first hybrid's center of curvature (or nodal point). Proper orientation of the chief rays helps restrict the beam divergence at the interface between the first and second hybrids, and it enables the second hybrid to adjoin the sub-images at the final image plane. It also facilitates the creation of a final pupil plane 56 within the rear-optic relay 24, which is essential for it to operate as a finite conjugate relay that can transform the second image array 54 into a final image plane 58. If designed properly, the final image will be flat, contiguous, without overlapping sub-images, and without distortion.

The finite conjugate relay lens makes the system compatible with artificial image capture devices that are flat. In previous systems the transformation has been accomplished using a dome shaped fiber optic taper that mimics the curved rhabdom in natural compound eyes. The fiber optic approach preserves the elegant symmetry of the natural compound eye, whereby relatively simple optics can be used to generate aberration free images, so long as the ommatidial axes never cross. If the ommatidial axes were to cross within the fore-optic, then the output image of the fore-optic would consist of inverted sub-images. Digital reconstruction would then be required to generate a contiguous image. If the fiber optics are to be replaced by conventional lenses in the form of a relay, then the ommatidial axes must be made to cross within the relay at a master pupil plane. The crossing of these axes is essential to preserving the continuity of the final image by ensuring that the conjoined sub-images are each oriented properly with respect to each other.

Though the hybridization of compound optics and single aperture optics seems to be confounded by contradictions, it is the contradictions that offer new optical design advantages. The first contradictory benefit works laterally across the field of view and pupil. Natural compound eyes preserve optical symmetry (to limit aberrations) by preventing the ommatidial axes, and their corresponding optical beams, from crossing. Natural single-chambered eyes preserve optical symmetry by requiring the chief rays to cross at a pupil plane, and by ensuring that the beams focus onto a concave surface. In a conventional lens system, which is modeled after the single chamber eye, an attempt is made to preserve the same optical symmetry when crossing the beams, but it breaks down and introduces aberrations at wide angles when attempting to image onto flat detector planes. In the artificial hybrid this apparent beam crossing contradiction between the two systems becomes an advantage if the lenslet surface shapes in the fore-optic are varied laterally across the arrays. The lenslet surfaces can then be designed concurrently with the conventional lens surfaces in the rear-optic to reduce optical aberrations in discrete increments across the field of view and pupil.

The second contradictory benefit works axially through the images to eliminate field curvature. Whereas natural compound eyes generate convex images, single-chambered eyes generate concave images, as mentioned above. This apparent contradiction becomes an advantage because it allows the opposing aberrations of the convex apposition image and the concave single chamber image to cancel at the final image plane 58. In contradistinction, if an intermediate image is introduced into a conventional lens system, then it tends toward concavity in order to preserve the optical path length across the field. Therefore, no field flattening advantage can be obtained by linking it to a conventional relay lens that likewise has an inherent tendency to generate a concave final image (i.e. a Petzval surface).

An example of a distortion free, multihybrid optical system is shown in FIG. 5. This is a schematic cross-sectional view of the system shown in FIG. 1 and is useful for illustrating how the system operates. Starting with the Keplerian telescope section of the superposition array optics, the light beams 36 enter through the objective lenslet superposition array 12. The lenslets in this array function to focus each beam and define the entrance pupil diameter 34. The beams are then channeled through hollow louver baffle light conduits 48 and exit through the louver baffle field stop array 50. Each light beam is centered on its own ommatidial axis 38, which links each field stop and lenslet to its own entrance pupil. Since each entrance pupil is oriented in the direction of the objects visible through the field stop, those objects are imaged with uniform irradiance. Therefore all objects within the entire field of view of the optical system are imaged with uniform irradiance. Unlike a conventional optical system, there is no cosine to the fourth irradiance degradation with field angle.

The light conduits of the louver baffle 14 also function to prevent cross-talk between lenslets, and thereby eliminate ghost images and stray light. This feature is advantageous for applications that need to isolate bright objects while viewing dim objects nearby. For example, star trackers need to view dim stars in relative proximity to the sun. The louver baffle 14 confines the solar beam within a single light conduit, and it allows all the other light conduits to track star light. Thus a star tracker can view stars to within a few degrees of the solar disc without the need for an external baffle.

The solar exclusion angle is set by the size of the field stops, which limit the angular extent of the beams passing through the conduits. They also define the size of the sub-images that are formed at the first image array 52, as well as the size and overlap of the conjugate sub-images formed on the convex shaped second image array 54 and the flat final image plane 58. If the field stops are circular, then the conjugate sub-images overlap and generate a hexagon shaped intensity pattern along the final image plane 58. The intensity pattern is an offset bias that can be eliminated digitally using a flat-field correction. If the field stops are hexagon shaped then the sub-images link together without overlap. This enables the intensity offset pattern to be eliminated optically. The detector's pixel-to-pixel response non-uniformities might still require a flat-field correction using a source beam of uniform intensity.

Continuing with the operational description, the beams exiting the field stop array enter the field inverting section of the superposition, array optics by passing through the field lenslet superposition array 16. Each lenslet in this array acts to reverse the field angles of the beams. The Keplerian reversal of the beam angles ensures that each of the first sub-images, which are inverted at the field stop apertures, are re-oriented to form a second array of sub-images that are upright. The second array of sub-images is formed when the first erector lenslet array 40 and the second erector lenslet array 41 focus each of the beams along its unique ommatidial axis 38. The lenslet arrays are curved to cause the beams to converge and thereby reduce the gaps between sub-images.

A design example is provided in the form of an optical prescription for the system shown in FIGS. 1 and 5. For simplicity of presentation the prescription is divided between the fore-optic and rear-optic. The fore-optic is described in FIGS. 6*a*, 6*b*, and 6*c*; the rear-optic is described in FIGS. 7*a* and 7*b*. It should be noted that the rear-optic prescription can be modified for different image sizes without changing the fore-optic prescription. This enables the rear-optic to be swapped out for different types of cameras and mounts, with the dowel pins 25 being relied upon to align the various rear-optic modules to the fore-optic module.

Figure 6C:
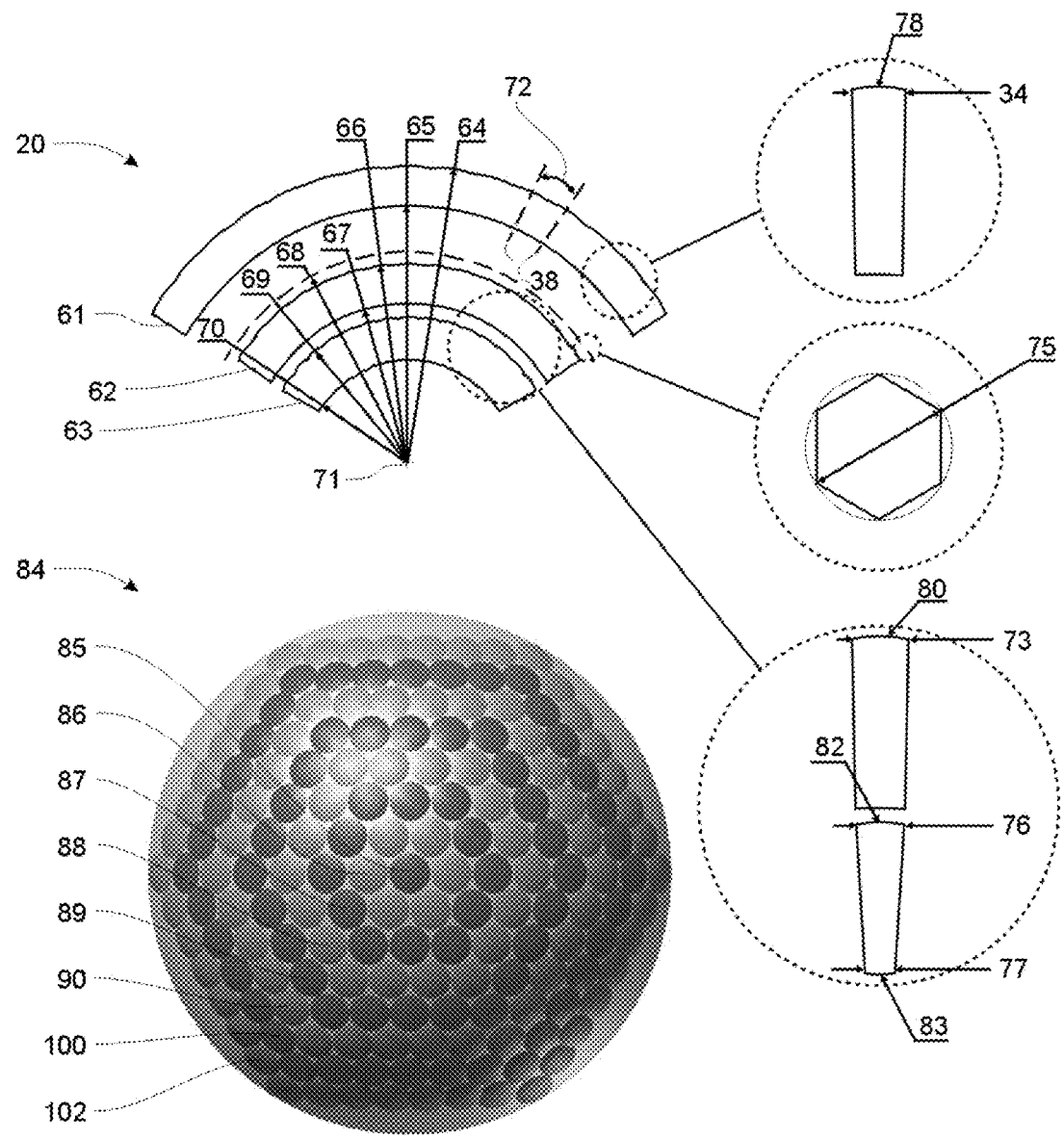
FIG. 6*c* is a schematic cross-sectional diagram depicting the components of the optical prescription listed in FIGS. 6*a* and 6*b*.

The fore-optic prescription begins in FIG. 6*a* with a listing of the optical parameters for an F/1.3 infrared system with a 120 degree field of view. The table below the system parameters lists the material and geometric properties for each of the three lens arrays. The table continues in FIG. 6*b* with a listing of the surface shapes of the lenslets within each of the arrays. The surface shapes vary for each of the eight zones that will be described below. FIG. 6*c* is a schematic diagram that helps describe the parameters listed in FIGS. 6*a* and 6*b*.

The materials selected for the lens arrays are amorphous, and they can either be manufactured by precision hot press molding, by diamond turning, or by diamond micro-milling. The optical designer should take care to adjust the refractive index and the design appropriately to accommodate the particular molding process, which might reduce the refractive index of the glass by a few percent. The prescription listed in FIGS. 6*a*, 6*b*, and 7*a* use the published refractive index values of the various materials, without alteration by molding, heating, polishing or diamond machining (diamond turning or diamond micro-milling). A representative refractive index is listed for each material at the 10 micron wavelength.

The first lens array material 61 is the amorphous glass IG4 produced by Vitron Corporation. The diameter of each lenslet in the first array is defined by the entrance pupil diameter 34. The radial position of each lenslet vertex is defined by the first array ring concentric radius 64, which is referenced with respect to a common nodal point at the center of curvature 71. The convex shape of each lenslet is defined by its conic constant and corresponding first lenslet curvature radius 78, which is referenced with respect to each lenslet vertex. The lenslet vertices are separated in elevation by the ommatidial axis separation angle 72. The second array ring concentric radius 65 in this design defines the concave radius of the base lens that holds the array, though it can be used to define lenslet positions if an additional array is to be added for superior performance. The lens array and base lens shapes are concentric, so their radii can be defined from the same nodal point.

The second lens array material 62 is the amorphous glass AMTIR2 produced by Amorphous Materials, Incorporated. Each of its lenslets has a radial position defined by the third array ring concentric radius 66, and a size defined by the third lenslet diameter 73. The convex shape of each lenslet is defined by the third lenslet curvature radius 80 and its corresponding aspheric coefficients. The fourth array ring concentric radius 67 in this design defines the concave radius of the base lens that holds the array, though it can be used to define lenslet positions if an additional array is to be added for superior performance.

The third lens array material 63 is the amorphous glass IG6 produced by Vitron Corporation. Each of its lenslets has a radial position defined by the fifth array ring concentric radius 69, and a size defined by the fifth lenslet diameter 76. The convex shape of each lenslet is defined by the fifth lenslet curvature radius 82 and its corresponding conic constant. The third lens array has an additional set of lenslets on the concave surface of its base. The radial positions of these lenslets are defined by the sixth array ring concentric radius 70, and they are sized according to the sixth lenslet diameter 77. The convex shape of each lenslet is defined by the sixth lenslet curvature radius 83.

The louver baffle 14 is not shown in FIG. 6*c*, but it would fit in the air space that separates the first lens array material 61 from the second lens array material 62. The field stop array ring concentric radius 68 is defined for a concave form since the field stops are exit apertures for the ommatidial beams. The field stop array aperture diameter 75 defines the field angle limit of the sub-images isolated by each field stop. Whether the field stop shape is circular or hexagonal, the same aperture dimension applies. The field stops are each centered on an ommatidial axis 38; the spacing between field stop centers is defined by the ommatidial axis separation angle 72.

The baffle structure is made using an inkjet technology that jets black, light absorbing photopolymer material into layers approximately 15-20 microns thick. Each photopolymer layer is cured by ultra-violet light immediately after it is jetted. The process enables the baffle's hollow light conduits to have either a tube or hexagon shaped geometry. The field stop array can be made as part of the baffle, or it can be made as a separate part by electroforming if sharp hexagon edges are required. The process involves manufacturing an expendable mandrel on to which is grown, by electroplating, a precision cut, "reverse image" of the mandrel in a meniscus shape. Once the desired plating thickness is achieved, then the entire piece is subjected to a chemical reduction that reacts with the mandrel, leaving, behind the nickel or copper structure. An array of hexagon apertures are cut into the structure either by laser ablation, electrical discharge machining, or chemical etching. The surface facing the baffle is blackened to minimize stray light scatter inside the baffle tubes, and the surface facing the infrared microbolometer array is gold plated to minimize thermal background emission.

As noted above, the performance of the integrated system can be enhanced by varying the lenslet surface shapes incrementally across each array. However, if the lenslet surfaces are to be optimized concurrently with the rear-optic surfaces, which are shaped symmetrically about the optical axis of the rear-optic relay 60, then the lenslet variation scheme must be rotationally symmetric about that same central axis. This is accomplished in the zonal pattern for ommatidial surface variations 84 shown in the bottom left corner of FIG. 6*c*. It is a hexapolar ring pattern that maximizes the lenslet packing density. Lenslets of the same shading, that are also in contact with each other, form a discrete zone of ommatidia with the same surface shapes. The central ommatidial zone 85 is represented by the center lenslet of dark shading, which is encircled by six lenslets of a lighter shading called the second ommatidial zone 86. The number of lenslets continues to increase by a factor of six for each of the subsequent zones. Thus the third ommatidial zone 87 is dark and has 2×6 lenslets, while the fourth ommatidial zone 88 is light and has 3×6 lenslets. The fifth ommatidial zone 89 is dark, the sixth ommatidial zone 90 is light, the seventh ommatidial zone 100 is dark, and the eighth ommatidial zone 102 is light. The total number of ommatidia in all eight zones is 169.

The optical prescription corresponding to the ommatidial surface shapes is provide in FIG. 6b. The eight zones are listed in the first column, and the lenslet surfaces along each ommatidium are listed in the second column. The radius, conic constant, and aspheric coefficients are listed in the subsequent columns. Some of the surfaces are spherical, some are conical, some are aspherical, and some are flat. It is noteworthy that the shapes of the first set of lenslets, on surface 78, are the same for all eight zones. This implies that the design can be further optimized if these surfaces are varied zonally, as was done for the other surfaces.

Figure 7B:
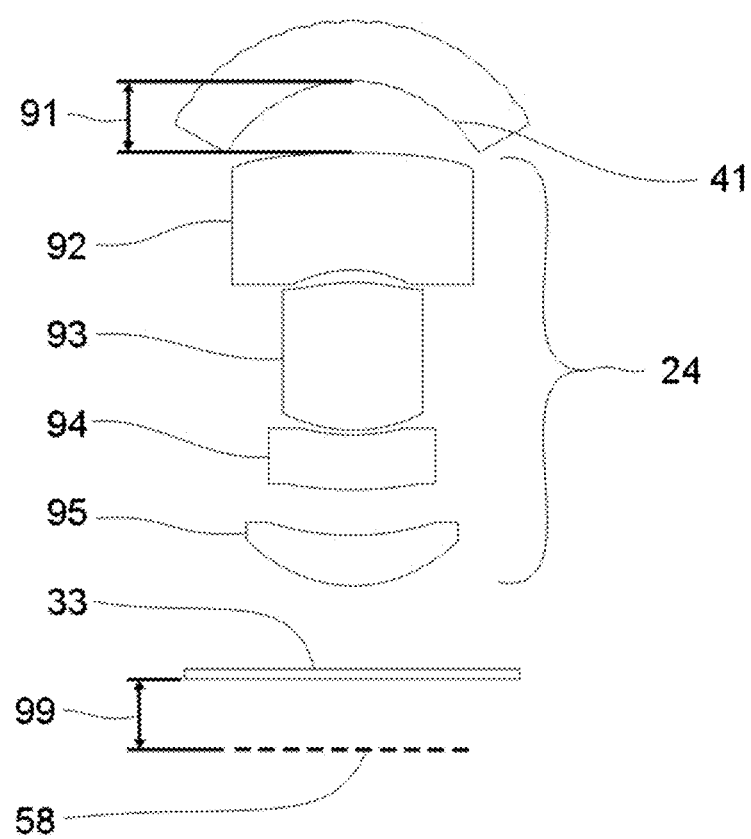
FIG. 7*b* is a schematic cross-sectional diagram depicting the components of the optical prescription listed in FIG. 7*a*.

FIG. 7a is a table listing the optical prescription for the rear-optic relay 24. The item numbers in the first column correspond to the drawing shown in FIG. 7b. In row one is give the separation distance between fore-optics, and rear-optics 91. In row two is given the glass material, thickness, radius, and aspheric coefficients for the first relay lens element 92. In row three and the subsequent odd numbered rows are given the refractive index at 10 microns, the second surface shape parameters, and the distance to the next lens element. The radius of curvature convention uses a minus sign (−) to denote a center of curvature on the left, otherwise the center of curvature is on the right. Thus the first relay lens element 92 is convex on the first surface and concave on the second surface, or positive meniscus. The second relay lens element 93 is double convex, while the third relay lens element 94 and fourth relay lens element 95 are both concavo-convex, or negative meniscus. The last optical element is the vacuum window 33, which is flat on both sides. The final row lists the separation distance between the last optical element and image plane 99. The infinity radius indicates a flat image plane.

Figure 8:
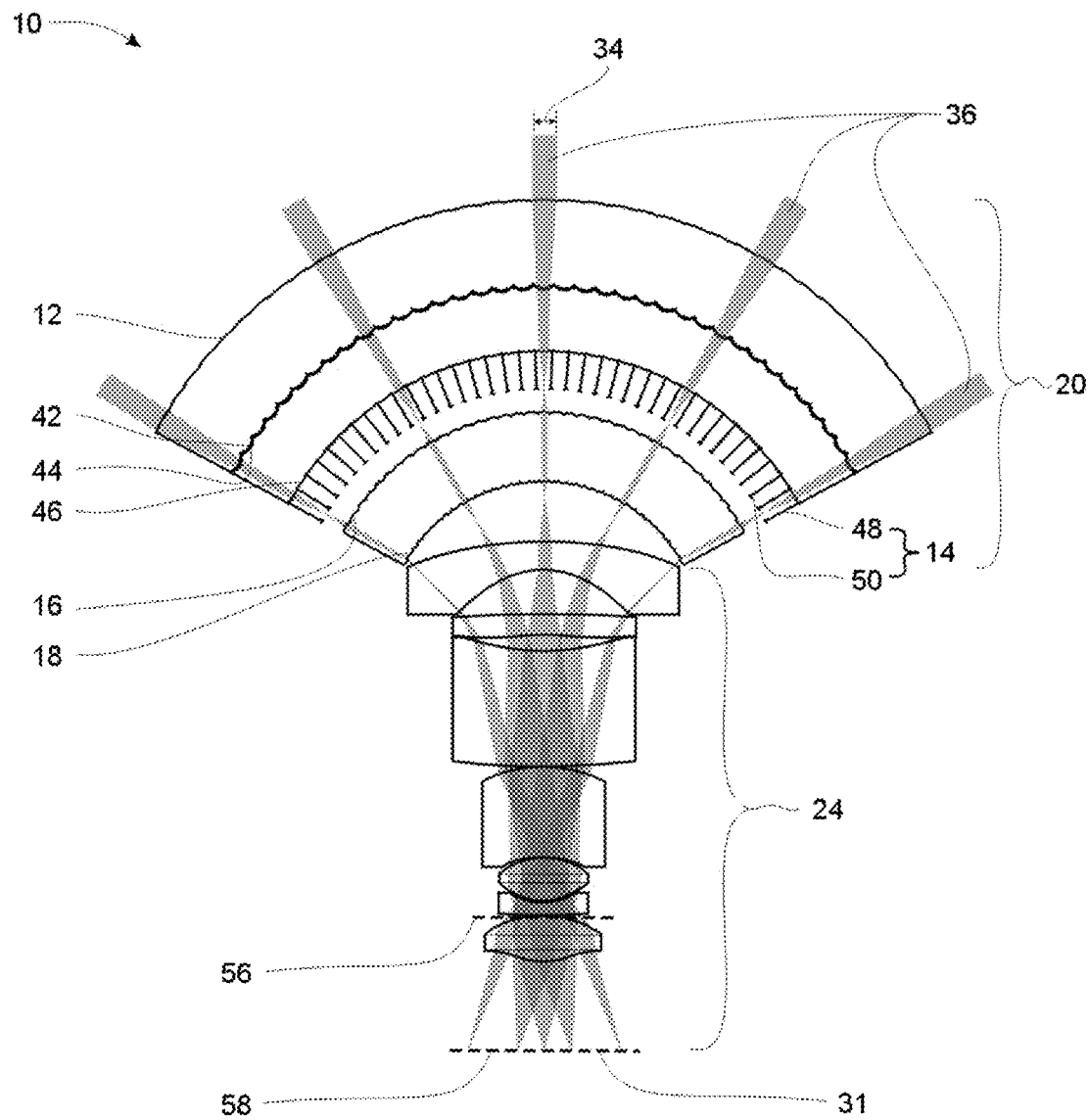
FIG. 8 is a schematic cross-sectional view of a multihybrid artificial compound eye with varied ommatidia constructed in accordance with an alternative embodiment of the invention.

FIG. 8 is a schematic cross-sectional view of an alternative embodiment of the invention designed for F/1.8 visible wavelength imaging across a 120 degree field of view. A visible wavelength detector array or an image intensified eyepiece system 31 can be positioned at the final image plane 58 to replace the infrared mosaic detector array with readout electronics 30 described in FIG. 1. The visible wavelength design includes a first objective achromatic doublet lenslet array 42, a second objective achromatic doublet lenslet array 44, and a third objective achromatic doublet lenslet array 46 fabricated from different glass materials to correct for chromatic aberrations. The glass containing the double convex lenslets has a refractive index and Abbe number similar to crown glass; the glass containing the concavo-convex shaped negative lenslets has an index and dispersion similar to flint glass. Together they produce the same achromatic characteristics of conventional doublets.

The first lens array material 61 is the moldable glass K-PFK90(M) produced by Sumita Optical Glass, Incorporated. The letter (M) following the glass name indicates that the design assumed the molded refractive index values. The molded value for the Fraunhofer "D" line, corresponding to the center of the yellow sodium double emission at 589.29 nm, is listed in FIG. 9a below the glass name. It has the high Abbe number (low relative dispersion) properties of a conventional crown glass. Though this material is glass, and the corresponding lens array is manufactured by precision hot press molding, a suitable plastic material can be substituted for the glass. In that case the lens array can be manufactured either by precision hot press molding, injection molding, or diamond turning. The first convex shape of each lenslet is defined by the first lenslet curvature radius 78 and its associated conic constant. The second convex shape of each lenslet is defined by the second lenslet curvature radius 79. These values are listed in FIG. 9a and continue in FIG. 9b for each of the ommatidial zones shown in the bottom left corner of FIG. 9c.

The second lens array material 62 is the moldable glass K-PSFN4(M) produced by Sumita. It has the high index, low Abbe number (high relative dispersion) properties of a flint glass. The concave lenslet shapes are defined by the third lenslet curvature radius 80 and its associated conic constant. The convex lenslet shapes are defined by the fourth lenslet curvature radius 81 and the fourth lenslet diameter 74. These values are listed in FIGS. 9a and 9b for each of the ommatidial zones.

The third lens array material 63 is the moldable glass K-LAFK50(M) produced by Sumita. It has index and Abbe values that are intermediate between crown and flint glasses. The glass includes the field lenslet superposition array 16 and the erector lenslet apposition array 18, both of which have convex, aspherical shapes. Their corresponding radii and aspheric coefficients are listed in FIGS. 9a and 9b for each of the ommatidial zones.

It is noteworthy that the zonal pattern for ommatidial surface variations 84 in this design is circular rather than hexapolar. The circular pattern is easier to formulate, but it has a lower ommatidial packing density. The pattern shown in FIG. 9c is actually a two-dimensional projection of the curved pattern, with each ommatidium represented by a shaded disc. Once again, discs of the same shading, that are also in contact with each other, form a discrete zone of ommatidia with the same surface shapes. In this case the central ommatidial zone 85 is represented by the central nineteen discs of the same dark shading. These dark discs are encircled by seventy-two discs of a lighter shading called the second ommatidial zone 86, and so on. The number of ommatidia per ring increases in factors of six as before. The total number of rings is 18, so the total number of ommatidia is 1027.

Figure 10B:
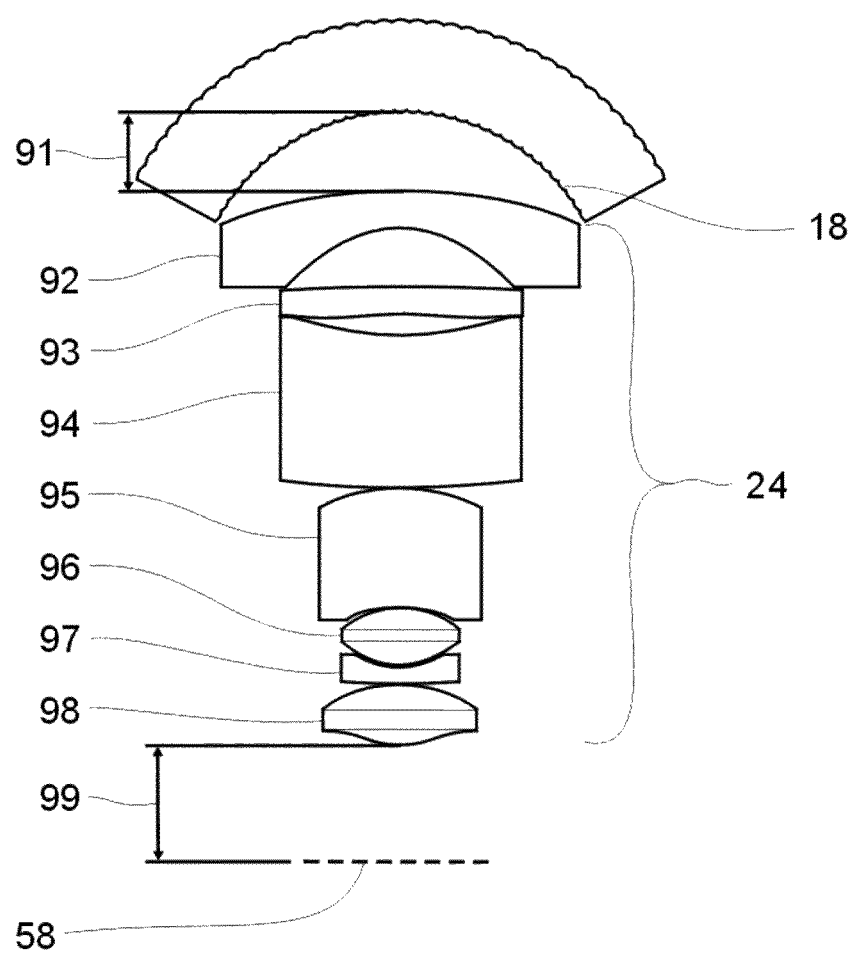
FIG. 10*b* is a schematic cross-sectional diagram depicting the components of the optical prescription listed in FIG. 10*a*.

FIG. 10a is a table listing the optical prescription for the rear-optic relay 24. The item numbers in the first column correspond to the drawing shown in FIG. 10b. The glass material names in the second column again have the letter (M) following them, indicating that the design assumed the molded index values. These values were obtained from the "Sumita Molding and Optical Glass Data" sheet for the Sumita glass types, and from the Rochester Precision Optics "Zemax Moldable Glass Catalog" for the other glass types. The design has three relay lens elements more than the infrared design. These are listed as the fifth relay lens element 96, the sixth relay lens element 97, and the seventh relay lens element 98.

Figure 11:
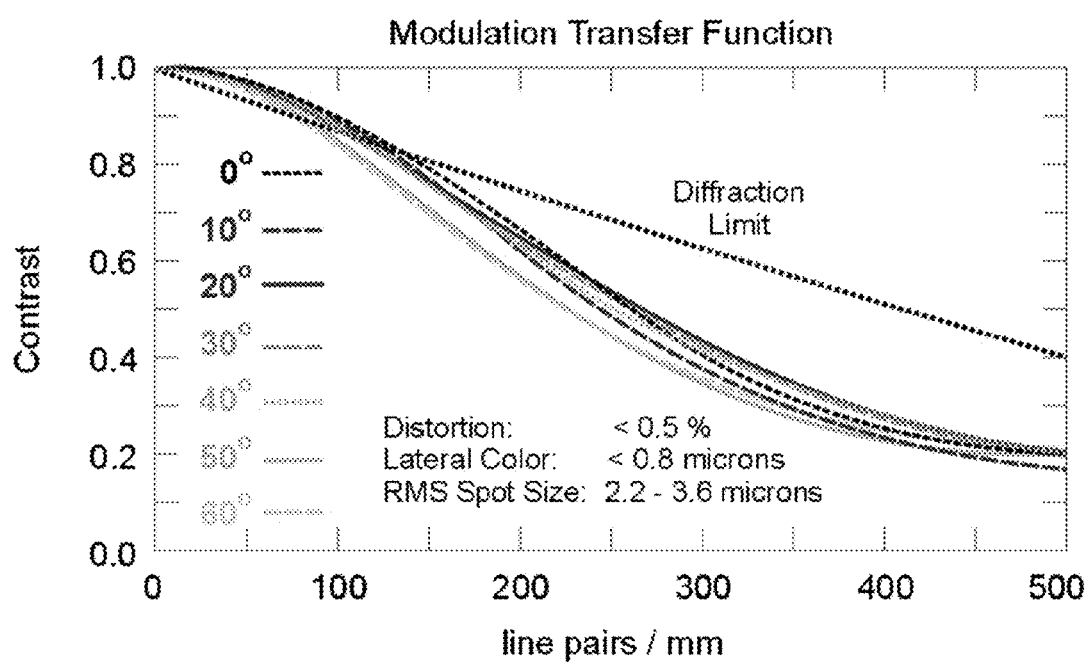
FIG. 11 is a plot showing the optical performance of the multihybrid artificial compound eye of the type illustrated in FIG. 8.

The relay lens elements were optimized together with the ommatidial surfaces to obtain an imaging performance superior to what is possible with either compound array optics or conventional optics alone. This is confirmed by the optical performance provided in FIG. 11 in the form of a polychromatic modulation transfer function (MTF). The MTF is plotted for geometric aberrations at seven different half-field-of-view angles and the diffraction limit. The MTF plot not only indicates a resolving capability exceeding 500 lp/mm, but there is very little variation with field angle. Most state-of-the-art, low F-number wide angle imaging systems not only struggle to achieve a resolving capability of 100 lp/mm, but the resolution degrades noticeably with field angle. The multihybrid design has the additional advantage of being able to reduce distortion and lateral color to negligible levels across the rather broad spectral range of 400-800 nm. It seems, therefore, that the new multihybrid architecture can provide a paradigm shift in our approach to optical design.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A multihybrid artificial compound eye with varied ommatidia for combining multiple aperture optics with single aperture optics, comprising:
   means for focusing multiple apertures of light into beams that form a first array of inverted sub-images with ommatidial chief rays oriented to adjoin the sub-images at the final image plane;
   means for isolating and sizing sub-images to minimize gaps and overlap at the final image plane, rigidly conformed to said means for focusing multiple apertures of light into beams that form a first array of inverted sub-images with ommatidial chief rays oriented to adjoin the sub-images at the final image plane;
   means for reversing the field angles of multiple light beams and orienting their ommatidial chief rays to cross and form an array of intermediate pupil planes, optically coupled to said means for isolating and sizing sub-images to minimize gaps and overlap at the final image plane;
   means for refocusing multiple light beams to form a second array of upright sub-images with ommatidial chief rays oriented to adjoin the sub-images at the final image plane, optically coupled to said means for reversing the field angles of multiple light beams and orienting their ommatidial chief rays to cross and form an array of intermediate pupil planes; and
   means for crossing multiple light beams and relaying them to transform the second array of sub-images into a substantially flat and contiguous final image, optically coupled to said means for refocusing multiple light beams while adjoining them to form a second array of upright sub-images with ommatidial chief rays oriented to adjoin the sub-images at the final image plane.

2. The multihybrid artificial compound eye with varied ommatidia in accordance with claim 1, wherein said means for focusing multiple apertures of light into beams that form a first array of inverted sub-images with ommatidial chief rays oriented to adjoin the sub-images at the final image plane comprises an objective lenslet superposition array, having rings of lenslets, that each define an ommatidial axis, with surface shapes that can be varied in annular increments.

3. The multihybrid artificial compound eye with varied ommatidia in accordance with claim 1, wherein said means for isolating and sizing sub-images to minimize gaps and overlap at the final image plane comprises a louver baffle, having array rings of hollow light, conduits, that are each aligned to an ommatidial axis and terminated by field stops, with sizes and shapes that can be varied in annular increments.

4. The multihybrid artificial compound eye with varied ommatidia in accordance with claim 1, wherein said means for reversing the field angles of multiple light beams and orienting their ommatidial chief rays to cross and form an array of intermediate pupil planes comprises a field lenslet superposition array, having rings of lenslets, that are each aligned to an ommatidial axis, with surface shapes that can be varied in annular increments.

5. The multihybrid artificial compound eye with varied ommatidia in accordance with claim 1, wherein said means for refocusing multiple light beams to form a second array of upright sub-images with ommatidial chief rays oriented to adjoin the sub-images at the final image plane comprises an erector lenslet apposition array, having rings of lenslets, that are each aligned to an ommatidial axis, with surface shapes that can be varied in annular increments and ommatidial chief rays oriented substantially toward a common center of curvature.

6. The multihybrid artificial compound eye with varied ommatidia in accordance with claim 1, wherein said means for crossing multiple light beams and relaying them to transform the second array of sub-images into a substantially flat and contiguous final image comprises a rear-optic relay, having at least one lens element.

7. A multihybrid artificial compound eye with varied ommatidia, comprising:
   an objective lenslet superposition array, having rings of lenslets, that each define an ommatidial axis, with surface shapes that can be varied in annular increments, for focusing multiple apertures of light into beams that form a first array of inverted sub-images with ommatidial chief rays oriented to adjoin the sub-images at the final image plane;
   a louver baffle, having array rings of hollow light conduits, that are each aligned to an ommatidial axis and terminated by field stops, with sizes and shapes that can be varied in annular increments, for isolating sub-images to minimize gaps and overlap at the final image plane, rigidly conformed to said objective lenslet superposition array;
   a field lenslet superposition array, having rings of lenslets, that are each aligned to an ommatidial axis, with surface shapes that can be varied in annular increments, for reversing the field angles of multiple light beams and orienting their ommatidial chief rays to cross and form an array of intermediate pupil planes, optically coupled to said louver baffle;
   an erector lenslet apposition array, having rings of lenslets, that are each aligned to an ommatidial axis, with surface shapes that can be varied in annular increments, for refocusing multiple light beams to form a second array of upright sub-images with ommatidial chief rays oriented to adjoin the sub-images at the final image plane, optically coupled to said field lenslet superposition array; and
   a rear-optic relay, having at least one lens element, for crossing multiple light beams and relaying them to transform the second array of sub-images into a substantially flat and contiguous final image, optically coupled to said erector lenslet apposition array.

8. The multihybrid artificial compound eye with varied ommatidia as recited in claim 7, further comprising:
   a mosaic detector array with readout electronics, for capturing and storing digital images, optically coupled to said rear-optic relay.

9. The multihybrid artificial compound eye with varied ommatidia as recited in claim 7, further comprising:
an image intensified eyepiece system, for amplifying low intensity light images and making them visible to the human eye, optically coupled to said rear-optic relay.

10. The multihybrid artificial compound eye with varied ommatidia as recited in claim 7, wherein said objective lenslet superposition array has characteristics selected from the following group: conformal, concentric, substantially meniscus shaped, being manufactured by hot press molding, being manufactured by injection molding, being manufactured by diamond machining, and having on the second surface and subsequent two surfaces, concentric rings of achromatic doublet lenslets with surface shapes that can be varied in annular increments.

11. The multihybrid artificial compound eye with varied ommatidia as recited in claim 7, wherein said louver baffle has characteristics selected from the following group: conformal, concentric, substantially meniscus shaped, being manufactured with light absorbing surface material, and having field stops that are hexagon shaped.

12. The multihybrid artificial compound eye with varied ommatidia as recited in claim 7, wherein said field lenslet superposition array has characteristics selected from the following group: conformal, concentric, substantially meniscus shaped, being manufactured by hot press molding, being manufactured by injection molding, and being manufactured by diamond machining.

13. The multihybrid artificial compound eye with varied ommatidia as recited in claim 7, wherein said erector lenslet apposition array has characteristics selected from the following group: conformal, concentric, substantially meniscus shaped, being manufactured by hot press molding, being manufactured by injection molding, and being manufactured by diamond machining.

14. The multihybrid artificial compound eye with varied ommatidia as recited in claim 7, wherein said rear-optic relay has characteristics selected from the following group: having a single optical axis that is coaxial to the central ommatidial axis, and having multiple lens elements that can be moved along the optical axis to alter the magnification of the second array of sub-images.

15. The multihybrid artificial compound eye with varied ommatidia as recited in claim 8, wherein said objective lenslet superposition array, has characteristics selected from the following group: conformal, concentric, substantially meniscus shaped, being manufactured by hot press molding, being manufactured by injection molding, being manufactured by diamond machining, and having on the second surface and subsequent two surfaces, concentric rings of achromatic doublet lenslets with surface shapes that can be varied in annular increments.

16. The multihybrid artificial compound eye with varied ommatidia as recited in claim 8, wherein said louver baffle has characteristics selected from the following group: conformal, concentric, substantially meniscus shaped, being manufactured with light absorbing surface material, and having field stops that are hexagon shaped.

17. The multihybrid artificial compound eye with varied ommatidia as recited in claim 8, wherein said field lenslet superposition array has characteristics selected from the following group: conformal, concentric, substantially meniscus shaped, being manufactured by hot press molding, being manufactured by injection molding, and being manufactured by diamond machining.

18. The multihybrid artificial compound eye with varied ommatidia as recited in claim 8, wherein said erector lenslet apposition array has characteristics selected from the following group: conformal, concentric, substantially meniscus shaped, being manufactured by hot press molding, being manufactured by injection molding, and being manufactured by diamond machining.

19. The multihybrid artificial compound eye with varied ommatidia as recited in claim 8, wherein said rear-optic relay has characteristics selected from the following group: having a single optical axis that is coaxial to the central ommatidial axis, and having multiple lens elements that can be moved along the optical axis to alter the magnification of the second array of sub-images.

20. A multihybrid artificial compound eye with varied ommatidia, comprising:
a conformal, concentric, substantially meniscus shaped objective lenslet superposition array, being manufactured by hot press molding and manufactured by injection molding and manufactured by diamond machining and having rings of lenslets, that each define an ommatidial axis, with surface shapes that can be varied in annular increments and on the second surface and subsequent two surfaces, concentric rings of: chromatic doublet lenslets with surface shapes that can be varied in annular increments, for focusing multiple apertures of light into beams that form a first array of inverted sub-images with ommatidial chief rays oriented to adjoin the sub-images at the final image plane;
a conformal, concentric, substantially meniscus shaped louver baffle, being manufactured with light absorbing surface material and having array rings of hollow light conduits, that are each aligned to an ommatidial axis and terminated by field stops, with sizes and shapes that can be varied in annular increments and field stops that are hexagon shaped, for isolating and sizing sub-images to minimize gaps and overlap at the final image plane, rigidly conformed to said objective lenslet superposition array;
a conformal, concentric, substantially meniscus shaped field lenslet superposition array, being manufactured by hot press molding and manufactured by injection molding and manufactured by diamond machining and having rings of lenslets, that are each aligned to an ommatidial axis, with surface shapes that can be varied in annular increments, for reversing the field angles of multiple light beams and orienting their ommatidial chief rays to cross and form an array of intermediate pupil planes, optically coupled to said louver baffle;
a conformal, concentric, substantially meniscus shaped erector lenslet apposition array, being manufactured by hot press molding and manufactured by injection molding and manufactured by diamond machining and having rings of lenslets, that are each aligned to an ommatidial axis, with surface shapes that can be varied in annular increments, for refocusing multiple light beams to form a second array of upright sub-images with ommatidial chief rays oriented to adjoin the sub-images at the final image plane, optically coupled to said field lenslet superposition array;
a rear-optic relay, having at least one lens element and a single optical axis that is coaxial to the central ommatidial axis and multiple lens elements that can be moved along the optical axis to alter the magnification of the second array of sub-images, for crossing multiple light beams and relaying them to transform the second array of sub-images into a substantially flat and contiguous final image, optically coupled to said erector lenslet apposition array;

a mosaic detector array with readout electronics, for capturing and storing digital images, optically coupled to said rear-optic relay; and an image intensified eyepiece system, for amplifying low intensity light images and making them visible to the human eye, optically coupled to said rear-optic relay.

\* \* \* \* \*